(12) United States Patent
Abbo et al.

(10) Patent No.: US 10,687,404 B2
(45) Date of Patent: Jun. 16, 2020

(54) COMMUNICATION INTERFACE AND ARRANGEMENT

(71) Applicant: SIGNIFY HOLDING B.V., Eindhoven (NL)

(72) Inventors: Anteneh Alemu Abbo, Eindhoven (NL); Johan-Paul Marie Gerard Linnartz, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/345,799

(22) PCT Filed: Oct. 18, 2017

(86) PCT No.: PCT/EP2017/076608
§ 371 (c)(1),
(2) Date: Apr. 29, 2019

(87) PCT Pub. No.: WO2018/077695
PCT Pub. Date: May 3, 2018

(65) Prior Publication Data
US 2019/0254145 A1 Aug. 15, 2019

(30) Foreign Application Priority Data
Oct. 28, 2016 (EP) .................................. 16196388

(51) Int. Cl.
*H05B 47/18* (2020.01)
*H01F 38/14* (2006.01)
(Continued)

(52) U.S. Cl.
CPC ............. *H05B 47/18* (2020.01); *H01F 38/14* (2013.01); *H02J 50/10* (2016.02); *H04B 5/0037* (2013.01); *H04B 5/0081* (2013.01)

(58) Field of Classification Search
CPC ............. H05B 37/0254; H05B 33/0803; H05B 33/0815; H05B 33/0893; H05B 37/0209;
(Continued)

(56) References Cited

U.S. PATENT DOCUMENTS

2012/0235636 A1* 9/2012 Partovi .................. H02J 7/025
320/108
2013/0264971 A1 10/2013 Yeh et al.
(Continued)

FOREIGN PATENT DOCUMENTS

CN 203590524 U * 5/2014
WO 20110141816 A1 4/2011
(Continued)

*Primary Examiner* — Renan Luque
(74) *Attorney, Agent, or Firm* — Akarsh P. Belagodu

(57) ABSTRACT

According to a concept of the invention, there is proposed a communication interface that enables communication and power transfer between a luminaire and a connectable module. The communication interface comprises a driver circuit which generates an AC power supply for a primary winding, the primary winding being magnetically couplable to a secondary winding for powering the connectable module. A data sensing arrangement is adapted to detect a variation in the voltage/current of the primary winding which has been induced by the secondary winding. A control arrangement selectively couples a first and second DC input, upon which the AC power supply is based, together or to a common voltage.

15 Claims, 5 Drawing Sheets

(51) Int. Cl.
*H02J 50/10* (2016.01)
*H04B 5/00* (2006.01)

(58) Field of Classification Search
CPC ............ H05B 37/0227; H05B 37/0272; H05B 33/0887; H01F 38/14; H02J 5/005; H02J 50/10; H02J 50/40; H02M 3/33507; Y02B 20/346
See application file for complete search history.

(56) References Cited

U.S. PATENT DOCUMENTS

| | | | | |
|---|---|---|---|---|
| 2016/0057838 | A1* | 2/2016 | Maros | H05B 37/0272 315/291 |
| 2017/0048937 | A1* | 2/2017 | Wang | H01F 38/14 |
| 2017/0288444 | A1* | 10/2017 | Komulainen | H02J 50/80 |
| 2017/0302110 | A1* | 10/2017 | Riehl | H02J 50/40 |
| 2018/0249539 | A1* | 8/2018 | Saccavini | H05B 33/0815 |

FOREIGN PATENT DOCUMENTS

| | | | |
|---|---|---|---|
| WO | 2015067757 | A1 | 5/2015 |
| WO | 2015145284 | A1 | 10/2015 |
| WO | 2016032928 | A1 | 3/2016 |

* cited by examiner

COMMUNICATION INTERFACE AND ARRANGEMENT

CROSS-REFERENCE TO PRIOR APPLICATIONS

This application is the U.S. National Phase application under 35 U.S.C. § 371 of International Application No. PCT/EP2017/076608, filed on Oct. 18, 2017, which claims the benefit of European Patent Application No. 16196388.9, filed on Oct. 28, 2016. These applications are hereby incorporated by reference herein.

FIELD OF THE INVENTION

This invention relates to the field of luminaires, and in particular to the field of communication interfaces between a luminaire and connectable modules.

BACKGROUND OF THE INVENTION

In the fields of home and building automation, there has been an increasing interest in controllable lighting systems. In such systems, there is a growing trend in the application of connectable modules for luminaires and adjacent applications. By way of example, some connectable modules may be used to allow a luminaire to communicate with a central controller or hub, or allow a sensor to connect to a luminaire in order to pass information about the environment.

It has been recognised that one of the challenges in realizing such systems is in ensuring effective power delivery and communication capabilities between a luminaire and the connectable modules. This issue is especially prevalent in areas of high humidity or dust, such as outdoor environments or even bathrooms and wet rooms, which require devices with sufficient ingression protection (IP) isolation.

It is known that power isolation between a luminaire and a connectable module may be provided through use of a wireless power transfer system. In order to ensure isolated communication between a luminaire and a connectable module, it is known to use an isolated communication interface, which typically incorporates opto-couplers and the like.

WO2011/041816 shows an DALI interface according prior art. WO2016/032928 shows different possibilities to implement DALI in an insulated manner without indicating how it can be implemented using the transformer only, in particular how to implement a return path without complexifying the circuit.

SUMMARY OF THE INVENTION

The invention is defined by the claims and it proposes a solution in which the return is implemented through the transformer. Such a solution enables to use DALI compatible modules on the secondary side without need of implementation of an additional communication channel.

There is herein proposed a communication interface of a luminaire for enabling isolated communication between the luminaire and a connectable module, the communication interface comprising: a driver circuit adapted to receive a first DC input and second DC input, the first and second DC inputs for controlling a light emitting element of the luminaire, wherein the driver circuit is adapted to generate an AC power supply; a primary winding adapted to be magnetically coupleable to a secondary winding for powering the connectable module and connected to the driver circuit so as to receive the AC power supply; a data sensing arrangement adapted to generate a control signal indicative of an induced current or voltage variation of the primary winding, the variation being induced by a current or voltage variation of the secondary winding; and a control arrangement comprising a control system adapted to generate a coupling control signal based on the control signal and a switch arrangement configured to controllably couple the first DC input and the second DC input together or to a common voltage based on the control signal, such that a voltage difference between the first DC input and the second DC input is dependent upon the current or voltage variation of the secondary winding.

There is thus provided a communication interface which enables or allows a connectable module to interact with a luminaire whilst remaining isolated from the luminaire. The communication interface is adapted so as to both provide power and enable communication with the connectable module via a pair of windings, a primary winding associated with the communication interface and a secondary winding associated with the connectable module.

The primary winding is provided with an AC power supply generated by a driver circuit. The alternating current flowing through the primary winding induces a similar, typically proportional alternating current in the secondary winding, analogously to a transformer, thereby providing a wireless (and thereby isolated) transfer of power for the connectable module.

The driver circuit is adapted to generate the AC power supply based on a first DC input and a second DC input.

The first and second DC inputs may, in some embodiments, be considered the only inputs or outputs of the communication interface. Thus, there may only be two leads or terminals through which the communication interface interacts with the remainder of the luminaire.

In order to detect a communication from the connectable module, the communication interface comprises a data sensing arrangement. The data sensing arrangement is adapted to detect a voltage or current variation in the primary winding, wherein the said variation has been induced by a voltage or current variation in the secondary winding.

A control arrangement is adapted to connect the first DC input and the second DC input together or to a common voltage. The control arrangement is adapted to hold both the first DC input and the second DC input at the same voltage when the data sensing arrangement detects that a variation on the primary winding has been induced by a parallel variation on the secondary winding.

The proposed concept enables both wireless power and bidirectional communication capabilities between a luminaire and a connectable module, whilst only necessitating the use of two wires, leads or terminals through which a control system of the luminaire communicates (being represented by the first and second DC inputs).

Furthermore, the proposed concept enables communication from a power harvesting device having no dedicated power source (i.e. the connectable module) to be passed to a device which powers the power harvesting device.

It is further noted that the concept proposed herein ensures that an isolation between the luminaire and the connectable module is maintained, as both power transfer and data communication are performed through a pair of windings. It is further noted that the concept permits a communication without the use of opto-couplers or other connectors, and that only two windings are required to provide both power and communicative capabilities to a connectable module.

Optionally, the communication interface further comprises a power select arrangement adapted to switch an input of the driver circuit between the first DC input and a reserve DC input based on the control signal.

Therefore, when receiving a communication from the connectable module, the power supply to the driver circuit may be maintained. In this way, the alternating current through the primary winding may not be significantly affected by the control arrangement coupling the first DC input and the second DC input together or to a common voltage. Thus, the luminaire may continue to provide power to the connectable device whilst simultaneously receiving a communication or data from the connectable device.

The communication interface may further comprise an energy storage system adapted to generate the reserve DC input.

By providing a dedicated energy storage system for generating the reserve DC input, isolation capabilities of the luminaire and/or communication interface may be increased. Furthermore, the energy storage system may ensure a consistent power supply for the driver circuit, such that the connectable module may continue to receive power from the luminaire.

In some embodiments, the energy storage system is adapted to receive and store power from the first DC input. Such embodiments may provide a more compact and low-power communication interface.

The energy storage system may be adapted to provide a power supply to the data sensing arrangement and the control arrangement. By adapting the energy storage system to provide the power supply, a reduction in the complexity and power requirements of the communication interface may be realised.

The control arrangement may comprise a coupling arrangement adapted to couple the first DC input to the second DC input based on a coupling control signal; and a control system adapted to generate the coupling control signal based on the control signal.

In at least one embodiment, the driver circuit comprises: an oscillator adapted to generate an AC power supply; and a modulator adapted to receive the first DC input and the second DC input and modulate the AC power supply based on a voltage difference between the first DC input and the second DC input.

In preferable embodiments, the first DC input and the second DC input are adapted to carry a modulated signal according to the Digital Addressable Lighting Interface standard.

The communication interface may further comprise the secondary winding, wherein the secondary winding is connectable to the connectable module.

The secondary winding may be formed as part of the communication interface, such that the connectable module may be directly connected (e.g. via wires) to the communication interface, yet still be isolated from the communication interface. This may allow, for example, a more secure physical connection between the communication interface and the connectable module, or may allow cheaper, non-wireless connectable modules to be provided for connection with the communication interface of the luminaire.

According to some embodiments, there may be provided a luminaire comprising: a communication interface as defined above; and a light emitting element adapted to be controlled based on the first DC input and the second DC input.

Thus, a light emitting element of the luminaire (e.g. an LED or halogen bulb) may be controlled based on the first DC input and the second DC input. Thus, the first and second DC inputs may carry information or encoded data indicating a desired operation of the light emitting element.

Luminaires according to this embodiment may thereby be controlled by the connectable module, as the connectable module may affect the voltage difference between the first and second DC inputs (via the control arrangement), which may control the light emitting element.

Such a luminaire may further comprise a luminaire control system adapted to generate the first DC input and the second DC input. Such a luminaire control system may be adapted to generate the first DC input and the second DC input which is provided to the communication interface.

The communication interface is adapted to modify or otherwise affect the first and second DC input (i.e. short circuit or couple them to a common voltage). The luminaire control system may be adapted to monitor the first and second DC inputs for such modifications. The communication interface may thereby communicate with the luminaire control system by modifying the first and second DC inputs generated by the luminaire control system. This enables a connectable module to bi-directionally communicate with the luminaire control system (and thereby the luminaire), as a modulation of the first/second DC input generated by the luminaire control system will be received by the connectable module, and a modification caused by the connectable module may be detected by the luminaire control system.

There is also proposed a luminaire arrangement comprising a luminaire having a communication interface as previously described and at least one connectable module comprising a secondary winding adapted to be magnetically coupleable with the primary winding of the luminaire.

It will be recognised that the communication interface may enable communication between the luminaire and more than one connectable module via the primary winding.

The luminaire arrangement may be adapted wherein the primary winding has a first number of turns, and the secondary winding has a second, different number of turns.

The primary winding and secondary winding may together be analogous to a step-up or step-down transformer. This may allow, for example, the luminaire and the connectable module(s) to operate at different voltages or according to different communication protocols.

There is also herein proposed a connectable module adapted for isolated communication between the communication interface as previously described and the connectable module, the connectable module comprising: a secondary winding adapted to be magnetically coupleable to a primary winding of a communication interface as defined above; a rectifier adapted to rectify an AC induced in the secondary winding by the primary winding; and a filter adapted to generate a first filtered DC output and a second filtered DC output.

The rectifier, for example, comprises a bridge rectifier.

There is also proposed a method of enabling isolated communication and power transfer between a luminaire and a connectable module, the method comprising: generating an AC power supply based on a first DC input and a second DC input, the first and second DC inputs for controlling a light emitting element of the luminaire; providing the AC power supply to a primary winding of the luminaire, the primary winding being magnetically coupleable to a secondary winding for powering the connectable module; generating a control signal indicative of an induced current or voltage variation of the primary winding, the variation being induced by a current or voltage variation of the secondary winding; controllably coupling the first DC input and the second DC input together or to a common voltage based on the control signal, such that a voltage difference between the first DC input and the second DC input is dependent upon the current or voltage variation of the secondary winding.

These and other aspects of the invention will be apparent from and elucidated with reference to the embodiment(s) described hereinafter.

BRIEF DESCRIPTION OF THE DRAWINGS

Examples of the invention will now be described in detail with reference to the accompanying drawings, in which.

DETAILED DESCRIPTION OF THE EMBODIMENTS

According to a concept of the invention, there is proposed a communication interface that enables communication between a luminaire and a connectable module.

Embodiments are at least partly based on the realisation that a luminaire which provides an isolated power supply for a connectable module may further provide an isolated transfer of data or information between the luminaire and connectable module. In particular, embodiments recognise that DC inputs, associated with the luminaire, may be controlled by sensing variations in the isolated power supply which are induced by the connectable module.

It has been recognised that such embodiments require a reduced number of components and inputs and allow for fast transfer of data with high fidelity. Illustrative embodiments may, for example, be employed in lighting systems or luminaires which require the capability of providing a power supply and communication with a connectable module in an isolated manner.

Figure 1:
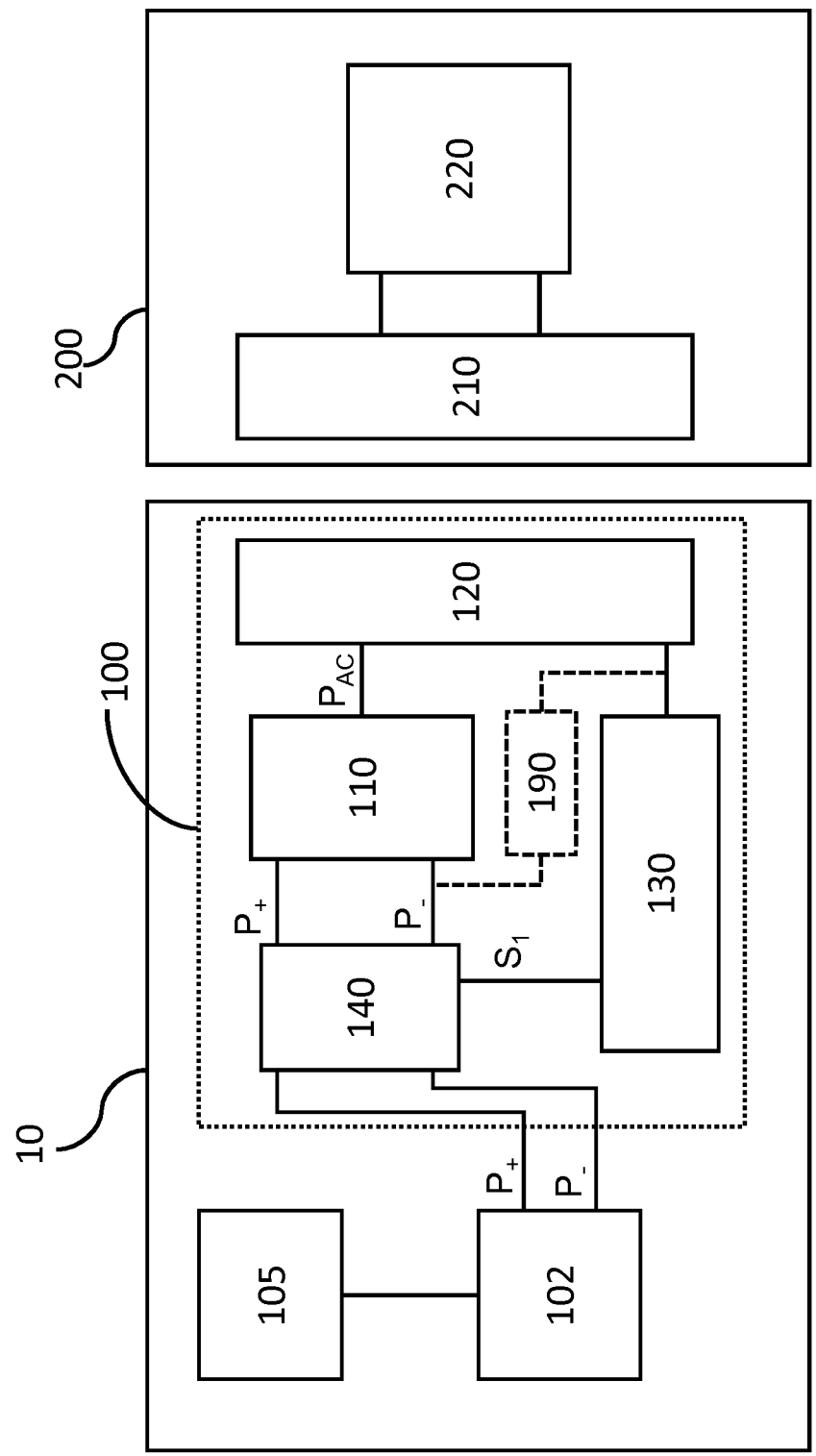
FIG. 1 illustrates a luminaire comprising a communication interface according to a first embodiment.

With reference now to FIG. 1, a first embodiment of a communication interface 100 may be understood.

FIG. 1 shows both a luminaire 10 and a connectable module 200. The luminaire 10 comprises a light emitting element 105, a luminaire control system 102 and the communication interface 100 according to the first embodiment.

As would be well understood by the person skilled in the art, the light emitting element 105 may comprise an LED, a tubular LED (TLED), an organic LED (OLED), an AMOLED or even a halogen bulb. Drivers for such light emitting elements are well known in the prior art, and may be formed as part of the light emitting element 105 or the luminaire control system 102.

The luminaire control system 102 is adapted to control and monitor signals on a first and second terminal (not shown). The first and second terminals are connected so as to provide first $P_+$ and second $P_-$ DC inputs for the communication interface 100. For example, the luminaire 10 may comprise a voltage source adapted to generate a signal of a first voltage, which is coupled to the first terminal to provide the first DC input $P_+$, and may provide a ground or reference line at the second terminal as the second DC input $P_-$. In some examples, the luminaire control system may further control the first and second DC inputs by selectively coupling the first and second DC inputs together (e.g. short-circuiting the DC inputs) or to a common voltage (e.g. ground). In yet other examples, a capacitance or impedance between the first and second DC inputs may be controlled (i.e. the first and second DC inputs may be controllably coupled together via a variable impedance). Thus, the luminaire control system may modulate the first and/or second DC inputs.

Furthermore, the luminaire control system 102 is adapted to monitor a voltage difference between the first and second terminals (i.e. monitor an induced change in the first $P_+$ and second $P_-$ DC inputs) to identify, for example, if the first and second DC inputs have been short-circuited or connected to a common voltage by an external (to the luminaire control system) source or component. In other words, the luminaire control system may detect when the first and second DC inputs (i.e. the first and second terminals) have been affected or modified by components other than itself. Such detection may be used as to provide an input to the luminaire control system 102 or to enable the luminaire control system to receive data or information from external sources.

In this way, the luminaire control system 102 may send data/communications to external sources by controlling the first and second DC inputs sources as well as receive data/communications from external sources (by monitoring a voltage difference between the first and second terminals, i.e. the first and second DC inputs). Purely by way of example, the luminaire control system may attempt to bidirectionally communicate with external sources by modulating the first DC input $P_+$ or by monitoring a modulation of the first DC input $P_+$.

For the sake of clarity, signals present at the first and second terminals of the luminaire control system 102 will be hereafter referred to as the first DC input $P_+$ and the second DC input $P_-$.

At least one of the first $P_+$ and second $P_-$ DC inputs may further act as a power supply or reference voltage for external components.

Preferably, the luminaire control system 102 is adapted to operate using a data protocol which is limited to only two wires, leads or terminals (respectively associated with the first and second DC inputs). Purely by way of example, this may be the Digital Addressable Lighting Interface (DALI) data protocol.

The operation of the luminaire 10 is controlled based on the first $P_+$ and second $P_-$ DC inputs. For example, properties of the light emitting element 105 may be controlled based on data received (from an external source) by the first $P_+$ and second $P_-$ DC inputs. In some examples, the luminaire control system 102 may control an intensity, luminosity, color, temperate or even light spread of the light emitting element 105 based on an external modification to the first $P_+$ and second $P_-$ DC input. Other modifiable properties of the light emitting element will be readily apparent to the skilled person.

The communication interface 100 hereafter described provides an innovative way for the luminaire control system 102 to communicate with a connectable module 200, whilst remaining isolated from the connectable module.

The communication interface 100 comprises a driver circuit 110, which is adapted to receive the first DC input $P_+$ and the second DC input $P_-$. The driver circuit 110 is adapted to generate an AC power supply $P_{AC}$ based on the first $P_+$ and second $P_-$ DC inputs. Thus, the first and second DC inputs may control or otherwise define the AC power supply $P_{AC}$ generated by the driver circuit.

For example, the first DC input $P_+$ may provide a power supply to the driver circuit 110, and the second DC input $P_-$ may provide a reference voltage (e.g. ground) to the driver circuit 110. The generated AC may vary (e.g. in voltage/current) between the voltage/current of the first DC input $P_+$ and the second DC input $P_-$.

The AC power supply $P_{AC}$ is provided to a primary winding 120 (i.e. a first winding) of the communication interface 120.

The primary winding 120 may, for example, comprise a coil, spiral or helix formed from an electrical conductor. The primary winding may thus be an electromagnetic coil formed in an analogous manner to an inductor. The primary winding 120 is connected, at a first end of the winding, to the driver circuit 110 so as to receive the AC power supply $P_{AC}$.

The primary winding 120 may be connected, at the second or other end of the winding, to ground, a reference voltage or to the second DC input $P_-$. Preferably, the primary winding 120 is connected to the second DC input $P_-$ via an impedance 190, such as a resistor, capacitor, inductor and so on.

The primary winding 120 is adapted to be magnetically couplable with a secondary winding 210 (i.e. a second winding) for powering the connectable module 200. Put conceptually, the primary winding 120 and the secondary winding 210 may be magnetically coupled together so as to form a transformer. An alternating current passing through the primary winding induces an alternating current through the secondary winding. In this way, power may be provided or transferred to the secondary winding for the connectable module 200, and may power further circuitry 220 of the connectable module 200.

In the present embodiment, the secondary winding 210 is formed as part of the connectable module 200. However, it will be understood that the secondary winding may, in alternative embodiments, be formed as part of the communication interface 100 or the luminaire 10. By way of example, the primary 120 and secondary windings 210 may be formed in a single transformer, such as an on-chip transformer or a monolithic transformer. In such embodiments, the connectable module may be connected via wires or leads to the secondary winding, yet remain isolated from the main circuitry or remainder of the luminaire 10 or communication interface 100. In this way, an isolation between the connectable module 200 and the luminaire 10 may be maintained, whilst using a wired connection. This may provide increased coupling efficiency and physical strength.

The communication interface 100 further comprises a data sensing arrangement 130 which is adapted to generated a control signal $S_1$ indicative of an induced current or voltage variation of the primary winding 120. The induced current or voltage variation is induced in the primary winding 120 by the magnetically coupled secondary winding 210.

By way of example, it has been recognised that if both ends of the magnetically coupled secondary winding 210 are held at a same voltage or are short circuited (e.g. they are both grounded), then the secondary winding induces a detectable variation in the voltage and/or current through the primary winding 110. Such variation is detected by the data sensing arrangement 130, which may generate the control signal $S_1$ based on this induced variation.

By way of example, the short-circuiting (e.g. of the secondary winding or terminals coupled to the secondary winding) results in a sudden impedance change that will also be reflected on the primary side due to magnetic coupling.

Alternatively, rather than short-circuiting, modulation may be introduced by varying the impedance across the secondary winding 210, e.g., via switched capacitance or resistance.

It has been recognised that the choice of modulation type may have an impact on the component parameters of the data sensing arrangement 130 and detection subsystems (e.g. additional circuitry coupled to or dependent upon signals received from the data sensing arrangement).

In at least one embodiment, the data sensing arrangement 130 monitors a voltage present at the impedance 190 in order to determine if modulation or variation has occurred on the secondary side. The data sensing arrangement may amplify a voltage present at the impedance (e.g. using an operational amplifier arrangement). Preferably, the data sensing arrangement comprises a filter arrangement adapted to block any steady state component (i.e. DC component) of the amplified voltage (present at the impedance), the filtered output being provided as the control signal $S_1$. In this way, only high-frequency current variation in the primary winding, such as those induced by the variation on the secondary winding, will be indicated by the control signal $S_1$.

The communication interface 100 further comprises a control arrangement 140 which is adapted to controllably couple the first DC input $P_+$ to the second DC input $P_-$ based on the control signal $S_1$. By way of example, if the control signal $S_1$ indicates that there is an induced (by the secondary winding) 210 current or voltage variation in the primary winding 120, then the control arrangement 140 couples the first DC input $P_+$ to the second DC input $P_-$. In this way, a variation in the current or voltage across the primary winding 120 caused by the secondary winding 210 may be reflected or mirrored by a coupling together (i.e. short circuiting or connecting via an impedance) of the first and second DC inputs.

It will be understood that the communication interface 100 provides an innovative method of permitting both power transfer and (data) communication between the luminaire 10 and the connectable module 200. Further, the communication interface 100 provides such a method whilst only having use of only two input/output wires or connections (represented by first and second DC inputs). In particular, the present invention provides means of exchanging power and data between a luminaire and a connectable module via inductive coupling.

In order to enable communication of data from the luminaire 10 to the connectable module 200, the luminaire control system 102 may controllably connect the first DC input $P_+$ and the second DC input $P_-$ together or to a common voltage (e.g. ground). In this way, the luminaire control system 102 may modulate the first/second DC inputs. In such a scenario, when the first DC and second DC input are at a same voltage, the driver circuit 110 is unable to generate an AC power supply $P_{AC}$ for the primary winding 120, such that no current is induced in the secondary winding 210 for powering the connectable module 200. The connectable module may simply monitor the current flowing through the secondary winding 210 to receive the data (as the presence and absence of current flowing through the secondary winding reflects the modulation of the first/second DC inputs).

Communication of data from the connectable module 200 to the luminaire 10 is not so simple, as even when modulating the voltage across the secondary winding, current would continue to flow through the primary winding 120, as the AC power supply $P_{AC}$ would continue to drive the current through the primary winding 120. That is, if no current flows through the primary winding, then no current flow through the secondary winding. However, if no current flows through the secondary winding, current may continue to flow through the primary winding.

However, the present invention permits a modulation of the voltage across the secondary winding 210 to be mirrored by the voltage difference between the first DC input $P_+$ and the second DC input $P_-$. That is, the present invention allows a modulation of the voltage across the secondary winding to be detected and provided to the luminaire control system.

This is due to the control arrangement 140 and data sensing arrangement 130 of the present invention selectably coupling (and thereby modulating) the first and second DC inputs based on an induced variation of voltage/current in the primary winding. In particular, the data sensing arrangement 130 checks whether a voltage/current variation has been induced in the primary winding by (e.g. a modulation of) the secondary winding and generates a control signal $S_1$ for the control arrangement 140. The control arrangement 140 couples the first and second DC inputs together or to a common voltage based on the control signal $S_1$. In some examples, the control arrangement controls a variable capacitance or impedance coupled between the first and second DC inputs (i.e. the first and second DC inputs may be controllably coupled together via a variable impedance).

The present invention thereby allows a connectable device 200 to communicate with the luminaire 10 through modulation of the voltage/current of the secondary winding 210.

By way of further example, the light emitting element 105 and luminaire control system 103 may operate on the basis of the Digital Addressable Lighting Interface (hereafter DALI) standard or data protocol.

Typically, DALI uses a DC bus, for example held at 15V, which is provided as a power supply for the light emitting element 105. Data signalling is performed by pulling the voltage down (e.g. attempting to ground the DC bus, or bring it to a lower reference voltage). In the present embodiment, the DC bus (for the luminaire 10) is represented by the first DC input $P_+$, and the ground or reference voltage is represented by the second DC input $P_-$.

The DALI data is transmitted using Manchester encoding and has a high signal to noise ratio which enables reliable communications in the presence of a large amount of electrical noise. In general embodiments DALI employs a diode bridge (e.g. in the luminaire control system 102) so that devices can be wired without regard for polarity. Signal levels are defined as 0±4.5 V for "0" and 16±6.5 V for "1". Central interface power maximum is 250 mA and 2 mA per unit.

The present invention allows the combination of DALI protocol systems with contactless or isolated power transfer. The connectivity freedom of such DALI systems is limited to only two wires, which the herein proposed invention recognises and provides a simple and innovative solution. Other, similar two-wire protocols may also be used to particular advantage with regard to the present invention.

The proposed concept is particularly advantageous for DALI systems, as the concept allows the use of sensors that are compliant with a typical DALI protocol system. Meanwhile, the idea allows for a luminaire to be modified to facilitate wireless power and data transfer. The concept also resolves the problem of typical DALI signals and voltages not being compatible with inductive or wireless transfer.

It will be further recognised, that the present invention may provide sufficient ingression protection for the interface between the luminaire and the connectable module. This is because a secure casing or waterproof material could be provided between the primary winding and the secondary winding.

Figure 2:
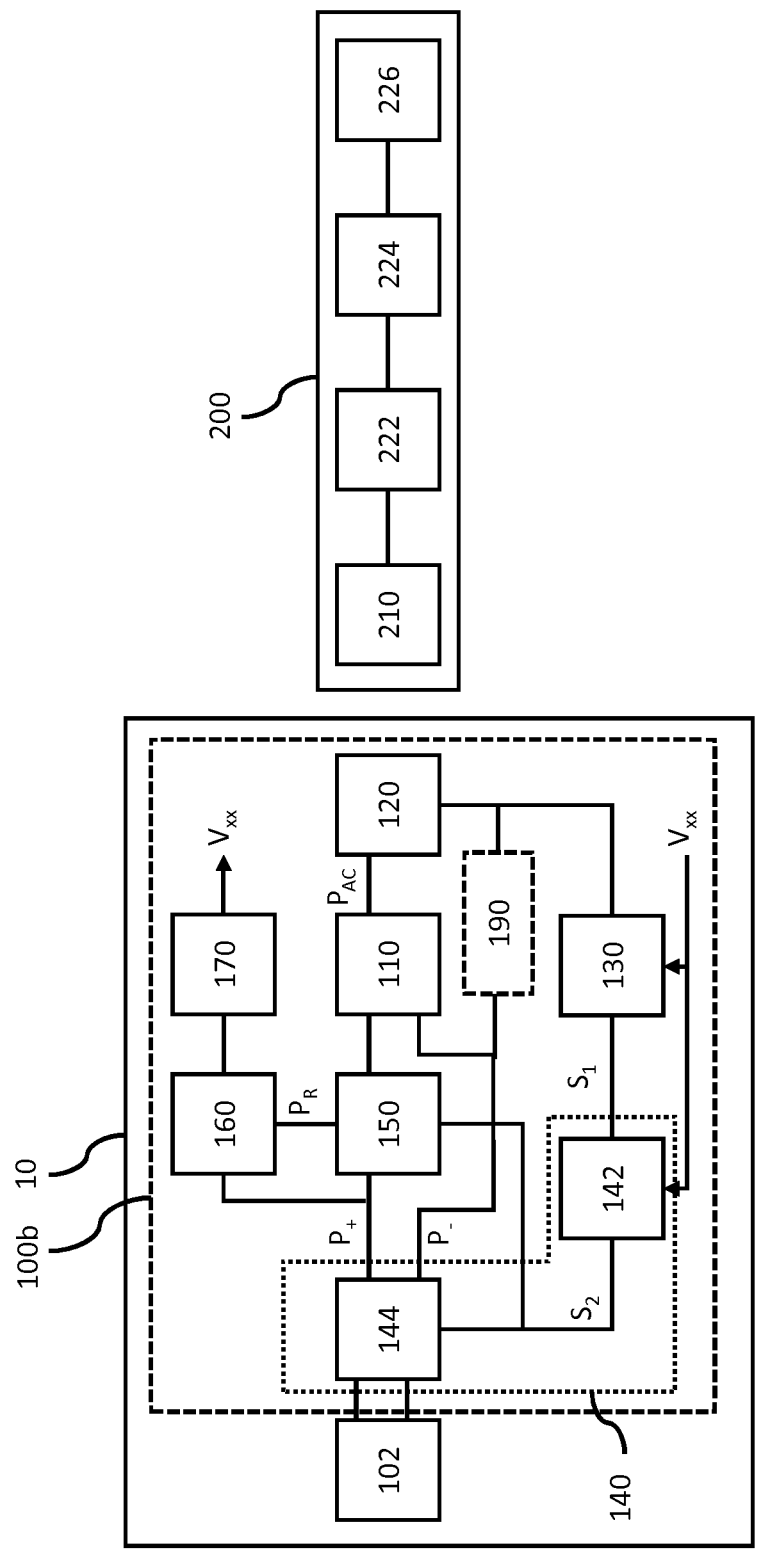
FIG. 2 illustrates a luminaire comprising a communication interface according to a second embodiment.

With reference now to FIG. 2, a second embodiment of a communication interface 100b may be understood.

The communication interface 100b comprises a driver circuit 110, a primary winding 120 and a data sensing arrangement 130. These features or modules operate in much the same way as previously described, and their operation shall not be repeated here for the sake of brevity.

The communication interface 100b also comprises a control arrangement 140, which is formed of a coupling arrangement 144 and a control system 142.

The coupling arrangement 144 is adapted to couple the first DC input $P_+$ and the second DC input $P_-$ together or to a common voltage based on a coupling control signal $S_2$ received from the control system 142. By way of example, the coupling arrangement may comprise a simple switch (e.g. MOSFET or JFET or bipolar), connecting the first DC input $P_+$ and the second DC input $P_-$ together, which is activated by the coupling control signal.

The control system 142 is adapted to generate the coupling control signal $S_2$ based on the control signal $S_1$ generated by the data sensing arrangement 130. By way of example, the control system may amplify or filter the control signal $S_1$ so as to generate the coupling control signal $S_2$. In other or further embodiments, the control system may be adapted to generate the coupling control signal $S_2$ based on at least a characteristic (e.g. frequency, voltage, current and so on) of the control signal $S_1$.

The communication interface 100b further comprises a power select arrangement 150 adapted to switch an input (i.e. power supply) of the driver circuit 110 between the first direction current input $P_+$ and a reserve DC input $P_R$ based on the control signal $S_1$ or the coupling control signal $S_2$ (which is based on the control signal $S_1$).

The power select arrangement 150 is adapted to switch a power supply for the driver circuit 110 to a reserve power supply $P_R$ when the first and second DC input are connected together or to a common voltage by the control arrangement 140. This ensures that the driver circuit 110 continues to generate an AC power supply $P_{AC}$ for the primary winding 120. In turn, this ensures that a wireless power supply for the connectable module 200 continues to be provided by the primary winding 120, as well as ensuring that a voltage across the primary winding is sufficiently high for proper operation (e.g. to enable communication).

The communication interface 100b may further comprise an energy storage system 160 adapted to generate the reserve DC input $P_R$. In preferable examples, the energy storage system is adapted to receive and store power or energy from the first DC input $P_+$ so as to provide an alternative or reserve power supply for the driver circuit. The energy storage system generates a reserve DC input/supply which is selectably provided to the driver circuit 110 by the power select arrangement 150. By way of example, the energy storage system may comprise a battery cell or capacitor which is charged by the first DC input $P_+$, and is discharged when connected by the power select arrangement to the driver circuit.

This provides a local energy storage system 160 which may operate at least the driver circuit 110, and optionally provide a power supply for the control arrangement 140, when the first and second DC inputs are at the same voltage.

The communication interface optionally further comprises a DC-DC converter 170, which is adapted to convert the reserve DC input/supply to an auxiliary power supply $V_{xx}$. This auxiliary power supply $V_{xx}$ may be provided as a power supply for the data sensing arrangement 130 and/or the control arrangement 140.

With continued reference to FIG. 2, a connectable module 200 according to an embodiment of the invention may be understood. The connectable module 200 comprises a secondary winding 210, a rectifying arrangement 222, a power/data filter 224 and additional components 226.

The secondary winding 210 operates in the same way as previously described, and will not be repeated here for the sake of brevity.

The rectifying arrangement 222 is adapted to rectify an output of the secondary winding 210. In this way, the rectifying arrangement may, for example, convert an alternating current flowing through the secondary winding 210 to a DC output. The rectifying arrangement may comprise, for example, a bridge rectifier, a half-bridge rectifier and so on.

The power/data filter 224 is adapted to filter an output of the rectifying arrangement 222. By way of example, the power/data filter may filter the output such that the output(s) of the power/data filter substantially matches the first $P_+$ and second $P_-$ DC inputs of the luminaire. In this way, the power/data filter 224 and the rectifying arrangement 222 together convert an output of the communication interface 100b (and the secondary winding 210) to be similar to or match the inputs (i.e. the first $P_+$ and second $P_-$ DC input) to the communication interface 100b.

The additional components 226 of the connectable module may be connected to receive the output(s) of the power/data filter. The additional components may, for example, comprise a connectable module control system (not shown), which is adapted to selectably couple the outputs of the power/data filter, to thereby control the voltage across the secondary winding. Such a connectable module control system may also monitor the voltage between the outputs of the power/data filter, in order to receive a communication from the luminaire 10. This allows for the connectable module to communicate with the luminaire control system 102 via the communication interface 100b.

Additional components 226 of the connectable module may comprise, for example, a sensory arrangement or wireless communication arrangement. By enabling a connectable module to communicate with the luminaire, further functions of the luminaire, such as networking capabilities or sensing capabilities, may be realised.

Suitable wireless communication protocols that the connectable module may use to communicate include an infrared link, ZigBee, Bluetooth, a wireless local area network protocol such as in accordance with the IEEE 802.11 standards, a 2G, 3G or 4G telecommunication protocol, and so on. Other formats will be readily apparent to the person skilled in the art.

Figure 3:
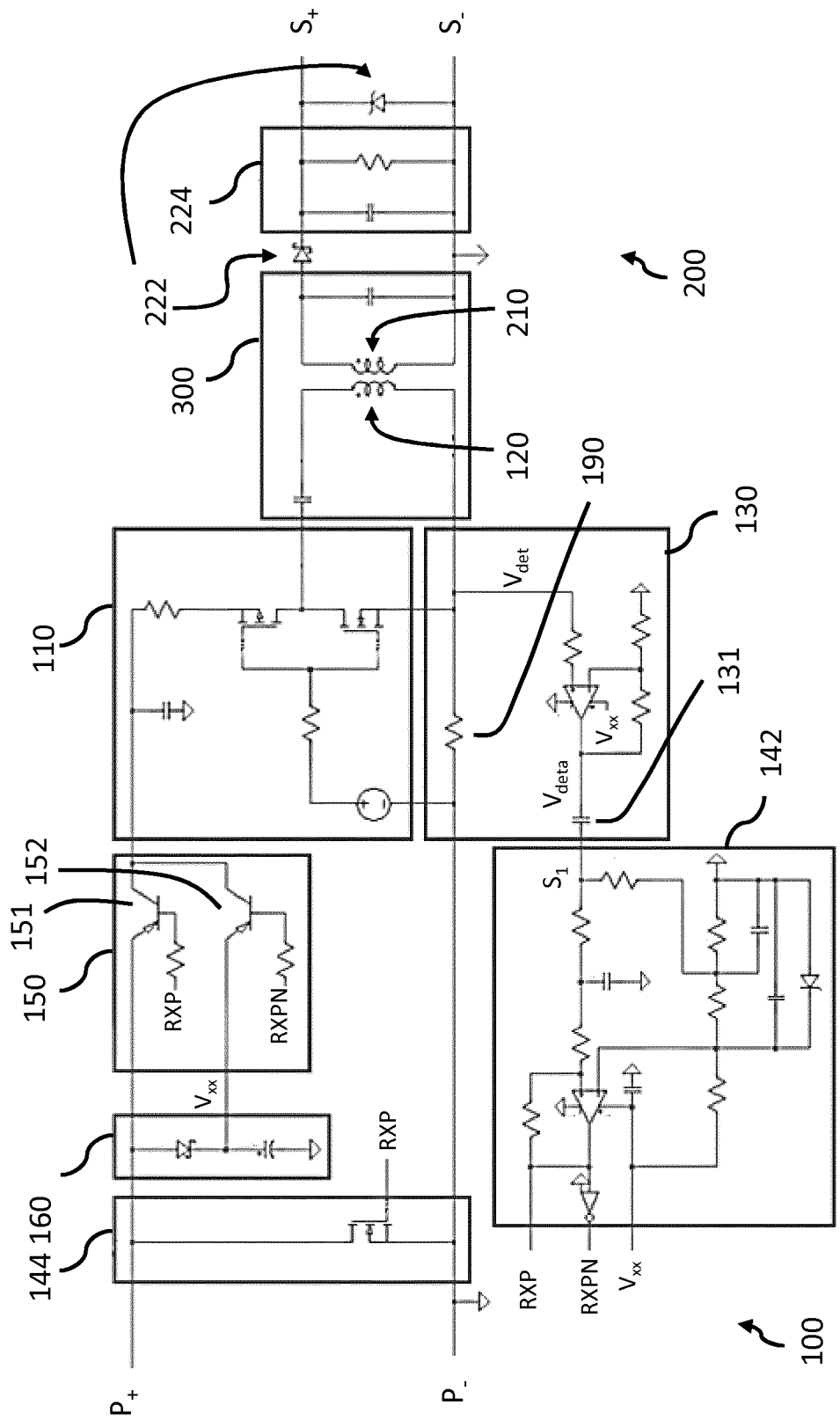
FIG. 3 illustrates a circuit diagram of a luminaire comprising a communication interface according to the second embodiment.

FIG. 3 illustrates a circuit diagram of the communication interface 100b according to the second embodiment.

The communication interface 100b comprises a driver circuit 110, primary winding 120, a data sensing arrangement 130 and the control arrangement 140. As before, the control arrangement 140 comprises a coupling arrangement 144 and the control system 142. It is further noted that the communication interface comprises the power select arrangement 150 and the energy storage system 160.

For the sake of clarity, there is also indicated the effective transformer 300 which is formed from the primary winding 120 and the secondary winding 210. As will be readily understood by the skilled person, such a transformer provides isolation between the communication interface and the connectable module.

The driver circuit 110 is adapted to generate an alternating current, AC power supply, having a voltage which varies between the voltage of the first DC input $P_+$ and the voltage of the second DC input $P_-$. Such driver circuits are well known in the prior art, and may be readily employed by the skilled person.

In the present embodiment, the data sensing arrangement 130 comprises an amplifier arrangement. The amplifier arrangement receives, as a power supply, the auxiliary power supply $V_{xx}$ generated by the energy storage system 160. The amplifier arrangement is adapted to amplify a detected variation of the voltage/current through/across the primary winding induced by a similar variation on the secondary winding. Preferably, the amplifier arrangement comprises at least one operational amplifier.

In particular, the impedance 190 (here a resistor) develops a detection voltage $V_{det}$ proportional to the current through it. In order to keep its power consumption low, the resistance of the impedance is preferably chosen to be small. This will, however, lead to small detection voltage $V_{det}$. In order to raise the voltage level of the detection voltage $V_{det}$, for example, to a value that may be processed by the control system 142, an amplifier arrangement is introduced (here comprising an Operational Amplifier LT1797 and a trio of resistor in the arrangement illustrated). Thus, the voltage output by the amplifier arrangement $V_{deta}$ is equal to a gain G of the amplifier arrangement multiplied by the voltage $V_{det}$ (i.e. $V_{deta}=G \cdot V_{det}$). A filter arrangement 131 (here a capacitor) is introduced to block any steady state (DC) content of $V_{deta}$ and outputs the control signal $S_1$. In this way, only high-frequency current variations in the primary winding, such as that caused by modulation or variation associated with the secondary winding, will pass through to the control system 142.

The control system 142 generates both a coupling control signal RXP and an inverse coupling control signal RXPN based on the control signal $S_1$. Both the coupling control signal RXP and the inverse coupling control signal RXPN are used to control the power select arrangement 150. The control system 142 further comprises a filter arrangement adapted to filter the control signal generated by the data sensing arrangement 130. In this way, the control system 142 may be adapted to determine if the control signal $S_1$ has correctly identified a variation in the current or voltage of the primary winding 120 induced by the secondary winding 210.

The power select arrangement 150 comprises a pair of MOSFET/bipolar transistors, a first MOSFET/bipolar transistor 151 adapted to selectably connect the first DC input to the driver circuit 110 and a second MOSFET/bipolar transistor 152 adapted to selectably connect the reserve DC input (from the energy storage system 160) to the driver circuit 110. The gate of the first MOSFET/bipolar transistor may be controlled by the coupling control signal RXP and the gate of the second MOSFET/bipolar transistor may be controlled by the inverse coupling control signal RXPN. In this way, only one MOSFET/bipolar transistor may be open at any given time.

The energy storage system 160 comprises a diode (e.g. a conventional or Schottky diode) and a capacitor connected in series. The diode is coupled at a first end to the first DC input $P_+$ and at a second end to a first plate of the capacitor such that current flows, in the forward direction, from the first DC input $P_+$ to the capacitor. The second plate of the capacitor is connected to the second DC input $P_-$. In this way, the first plate of the capacitor builds up a charge when the first DC input is high (e.g. not coupled to the second DC input), and such charge is not lost when the first DC input is coupled to the second DC input (due to the arrangement of the diode). Thus, energy or power may be stored on the first plate of the capacitor of the energy storage system.

FIG. 3 also depicts a connectable module according to an embodiment, the connectable module comprising a rectifying arrangement 222 and a power/data filter 224 which is adapted to generate a first filtered DC output $S_+$ and a second filtered DC output $S_-$. The first filtered DC output and the second filtered DC output are analogous to the first DC input and the second DC input of the luminaire. The first and second filtered DC output provide both power and bi-directional communication capabilities to the connectable module 200.

Presently, the rectifying arrangement 222 comprises a pair of diodes, a first diode acting as a normal, conventional rectifier diode and a second diode acting as an output voltage clamping Zener diode for limiting voltage between S+ and S− terminals. However, it will be understood that alternative rectifiers (e.g. full bridge rectifiers) may be used to particular advantage.

The power/data filter 224 comprises a parallel arrangement of a resistor and a capacitor. Such an arrangement is particularly advantageous, as the output voltage will be equal to the input voltage, but residual AC components may be filtered out.

Figure 4:
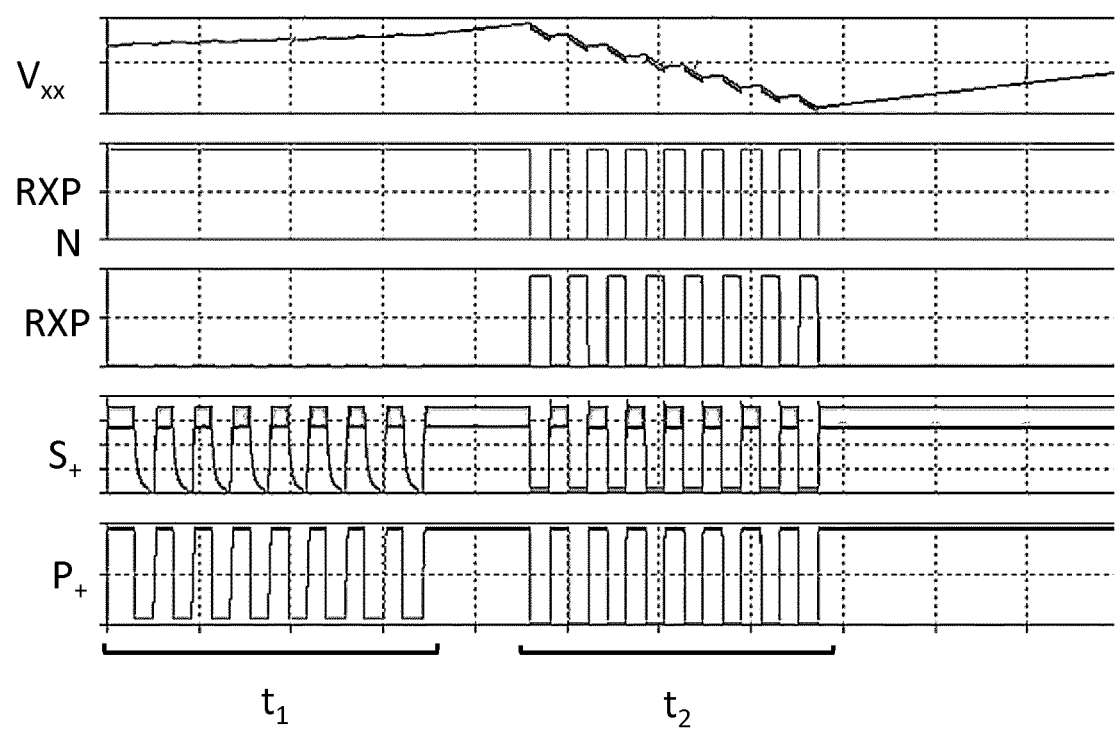
FIG. 4 illustrates simulation results of the luminaire comprising a communication interface according to the second embodiment.

With further reference to FIG. 4, which depicts simulation results for a scenario carried out on the communication interface according to the second embodiment, a further understanding of this second embodiment may be elucidated. For the present embodiment, both the second DC input $P_-$ and the second filtered DC output $S_-$ are held at a ground or reference voltage.

During a first time period $t_1$, the first DC input $P_+$ is modulated according to a pattern. In particular, the first DC input is periodically coupled to the second DC input $P_-$ according to a communication protocol/encoding method (e.g. Manchester encoding). It will be understood that the modulation of the first DC input may be performed by the luminaire control system 102.

Due to the fact that the driver circuit 110 receives the first DC input as input, and the data sensing arrangement 130 has not detected a variation on the primary winding induced by a change on the secondary winding, the voltage across the primary winding periodically drops to 0 according to the encoding method. This is mirrored by the voltage $S_+$ across the secondary winding, which also periodically drops to 0.

Put simply, when the luminaire 10 attempts to transmit data or to communicate with the communication module 200, the first DC input and the second DC input are shorted (i.e. short-circuited), and the first filtered DC output and the second filtered DC output charge and discharge accordingly.

It should also be noted that during this time period $t_1$, the voltage $V_{xx}$ held by the energy storage system 160, being a reserve power supply, is charged by the first DC input.

During a second time period $t_2$, the first filtered DC output $S_+$ is modulated according to another pattern. The modulation of the first filtered DC output may be performed by additional circuitry 220 of the connectable module 200 modulated (e.g. a connectable module control system).

During the second time period $t_2$, the connectable module 200 is attempting to transmit data or communicate with the luminaire 10. The control system 142 and the data sensing arrangement 130 together detect a change in the current through, or the voltage across, the primary winding 120 caused by this modulation of the first filtered DC output $S_+$.

In doing so, the control system 142 generates a coupling control signal RXP and an inverse coupling control signal RXPN. It is noted that these two signals follow the same modulation pattern as that of the modulation performed to the first filtered DC output $S_+$. Proper selection of detection threshold by the control system 142 allows for the effect of modulation of the first and/or second DC input on the control signals RXP and RXPN to be mitigated. Typically, RXP and RXPN will be held in a default state (e.g. when no modulation of the first filtered output occurs) in which switch 144 is OFF, switch 151 is ON and switch 152 is OFF.

The coupling arrangement 144 receives the coupling control signal RXP and selectively couples the first DC input $P_+$ to the second DC input $P_-$ or a reference voltage based on this signal. In this way, the voltage difference between the first DC input and the second DC input may be modulated by the coupling arrangement 144 to match that of the modulation of the first filtered DC output.

Furthermore, during the second time period $t_2$, whilst the first DC input $P_+$ is short-circuited or coupled to a reference voltage, the voltage level of the voltage held by the energy storage system 160 reduces. This is due to the power select arrangement 150 coupling the reserve power supplied to the coil driver thereby reducing the voltage held by the energy storage system (i.e. reserve power supply).

Figure 5:
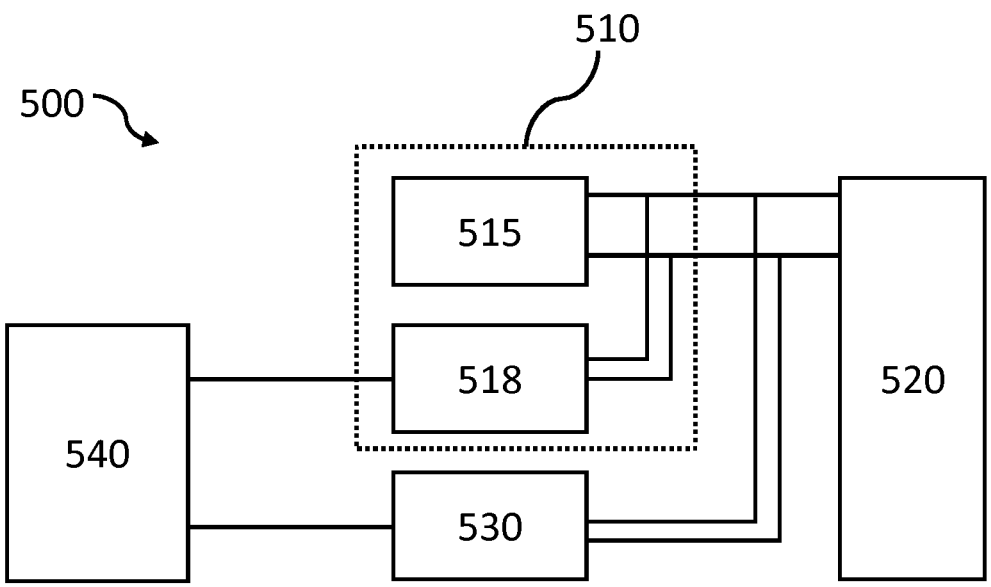
FIG. 5 illustrates a communication interface of a luminaire according to a third embodiment.

With reference now to the FIG. 5, a third embodiment of a communication interface 500 may be understood.

The communication interface 500 comprises a driver circuit 510, a primary winding 520, a data sensing arrangement 530 and a control arrangement 540.

The driver circuit 510 comprises an oscillator circuit 515, which is adapted to generate the AC power supply. The oscillator circuit 515 is adapted to generate the AC power supply on two lines, as is well known in the prior art. Purely for the sake of example, the oscillator may generate an AC supply of 13.56 MHz. This frequency may be particularly advantageous as it is a recognised ISM (industrial, scientific and medical radio) band.

The driver circuit 510 further comprises a modulator 518 which is adapted to connect the outputs of the driver circuit together or to a common voltage. The modulator 518 is adapted to receive a modulation signal from the control arrangement 540 in order to determine when the outputs of the driver circuit are to be connected together or to a common voltage.

The control arrangement 540 is adapted to generate the modulation signal for communicating with the connectable module, e.g. based on a signal received from a luminaire control system (not shown). In this way, the voltage across the primary winding 520 may be representative of the data to be communicated to the connectable module.

In some embodiments, the data sensing arrangement 530 may be adapted to receive the signal (having an alternating current) passing through the primary winding 520, and filter the DC component from said signal. The data sensing arrangement 530 may be further adapted to detect negative pulses in the filtered signal, such negative pulses being indicative of a variation in the current/voltage through/across the secondary winding.

Thus, the data sensing arrangement may be adapted to detect modulation or short-circuiting of the secondary winding (of the connectable module).

In some embodiments, the control arrangement 540 is further adapted to generate the modulation signal based on a control signal received from the data sensing arrangement 530. In this way, for the present embodiments, the voltage or current through/across the primary winding reflects that of the current or voltage through/across the secondary winding.

In some embodiments, the number of turns on the primary winding and the secondary winding may be different. In this way, the primary winding in the secondary winding may together act as a step up or a stepdown transformer. According to such embodiments, the connectable module is not limited to operating at the same voltage/power as the luminaire.

It will be readily apparent that some embodiments propose a luminaire system or arrangement comprising a luminaire as previously described and a connectable module as previously described.

Preferably, and as briefly described above, the luminaire arrangement is adapted to operate using the DALI protocol. It will be understood that the voltages on the first DC input $P_+$ and the second DC input $P_-$ are not limited to those defined by the DALI standard, but may rather have arbitrary or particular detection thresholds. Indeed, the proposed enhancements to power and data transfer in an isolated environment may be used in protocols, other than the DALI standard, that may benefit from power and data transfer on the same two wires.

According to another embodiment of the invention, there is proposed a method of enabling isolated communication between the luminaire and the connectable module. The method comprises generating a control signal indicative of an induced current or voltage variation of a primary winding of the luminaire, the variation being induced by a current or voltage variation of a secondary winding magnetically coupled to the primary winding. The method further comprises controllably coupling a first DC input and the second DC input together or through a common voltage based on the control signal. The first DC input and the second DC input is adapted to be received by a driver circuit which generates an AC power supply based on said DC inputs. This AC power supply is provided to the primary winding.

Figure 6:
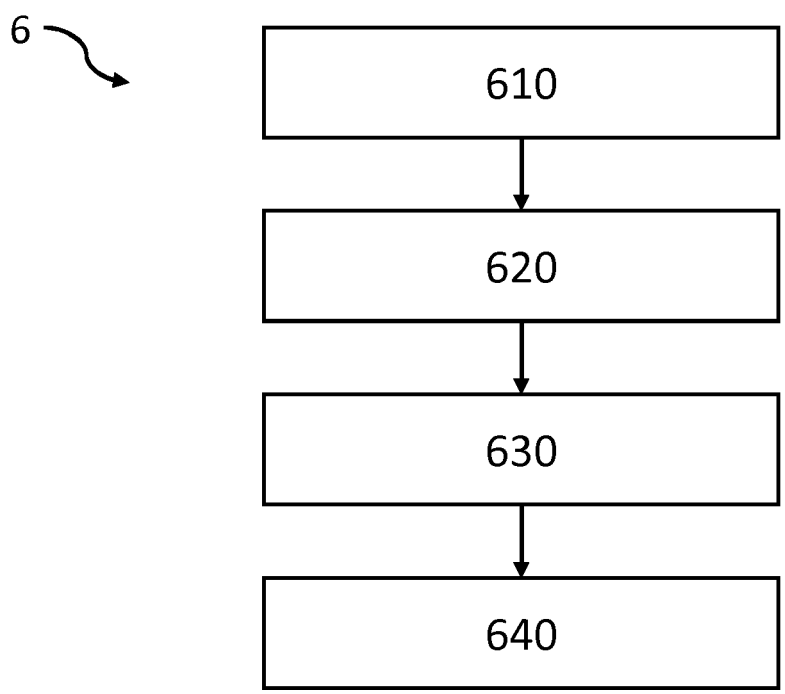
FIG. 6 illustrates the method of communication and power transfer.

FIG. 6 shows a method 6 of enabling isolated communication and power transfer between a luminaire and a connectable module, the method comprising: generating 610 an AC power supply based on a first DC input and a second DC input, the first and second DC inputs for controlling a light emitting element of the luminaire; providing 620 the AC power supply to a primary winding of the luminaire, the primary winding being magnetically coupleable to a secondary winding for powering the connectable module; generating 630 a control signal indicative of an induced current or voltage variation of the primary winding, the variation being induced by a current or voltage variation of the secondary winding; controllably coupling 640 the first DC input and the second DC input together or to a common voltage based on the control signal, such that a voltage difference between the first DC input and the second DC input is dependent upon the current or voltage variation of the secondary winding.

The method may further comprise modulating the first DC input so as to provide a communication from the luminaire to the connectable module.

The present invention may be a system, a method, and/or a computer program product.

The flowchart and block diagrams in the Figures illustrate the architecture, functionality, and operation of possible implementations of systems and methods according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A communication interface of a luminaire for enabling isolated communication between the luminaire and a connectable module, the communication interface comprising:
    a driver circuit adapted to receive a first DC input and second DC input, the first and second DC inputs for controlling a light emitting element of the luminaire, wherein the driver circuit is adapted to generate an AC power supply;
    a primary winding adapted to be magnetically coupleable to a secondary winding for powering the connectable module and connected to the driver circuit so as to receive the AC power supply;
    wherein the communication interface further comprises:
    a data sensing arrangement adapted to generate a control signal indicative of an induced current or voltage variation of the primary winding, the variation being induced by a current or voltage variation of the secondary winding; and
    a control arrangement comprising a control system adapted to generate a coupling control signal based on the control signal and a switch arrangement configured to controllably couple the first DC input and the second DC input together based on the control signal, such that a voltage difference between the first DC input and the second DC input is dependent upon the current or voltage variation of the secondary winding.

2. The communication interface of claim 1, further comprising a power select arrangement adapted to switch an input of the driver circuit between the first DC input and a reserve DC input based on the control signal.

3. The communication interface of claim 2, further comprising an energy storage system adapted to generate the reserve DC input from the first DC input.

4. The communication interface of claim 3, wherein the energy storage system is adapted to receive and store power from the first DC input.

5. The communication interface of claim 3, wherein the energy storage system is adapted to provide a power supply to the data sensing arrangement and the control arrangement.

6. The communication interface of claim 1, wherein the driver circuit comprises:
   an oscillator adapted to generate an AC power supply; and
   a modulator adapted to receive the first DC input and the second DC input and modulate the AC power supply based on a voltage difference between the first DC input and the second DC input.

7. The communication interface of claim 1, wherein the first DC input and the second DC input carry a modulated signal according to a Digital Addressable Lighting Interface standard.

8. The communication interface of claim 1, further comprising the secondary winding, wherein the secondary winding is connectable to the connectable module.

9. A luminaire comprising:
   a communication interface according to claim 1, and
   a light emitting element adapted to be controlled based on the first DC input and the second DC input.

10. The luminaire of claim 9, further comprising a luminaire control system adapted to generate the first DC input and the second DC input.

11. A luminaire arrangement comprising:
    a luminaire having a communication interface according to claim 1;
    at least one connectable module comprising a secondary winding adapted to be magnetically coupleable with the primary winding of the luminaire.

12. The luminaire arrangement of claim 11, wherein the primary winding has a first number of turns, and the secondary winding has a second, different number of turns.

13. A connectable module adapted for isolated communication between the communication interface of claim 1 and the connectable module, the connectable module comprising:
    the secondary winding adapted to be magnetically coupleable to the primary winding of the communication interface
    a rectifier adapted to rectify an AC induced in the secondary winding by the primary winding; and
    a filter adapted to generate a first filtered DC output and a second filtered DC output.

14. A method of enabling isolated communication and power transfer between a luminaire and a connectable module, the method comprising:
    generating an AC power supply based on a first DC input and a second DC input, the first and second DC inputs for controlling a light emitting element of the luminaire;
    providing the AC power supply to a primary winding of the luminaire, the primary winding being magnetically coupleable to a secondary winding for powering the connectable module;
    generating a control signal indicative of an induced current or voltage variation of the primary winding, the variation being induced by a current or voltage variation of the secondary winding;
    controllably coupling the first DC input and the second DC input together and to a common voltage based on the control signal, such that a voltage difference between the first DC input and the second DC input is dependent upon the current or voltage variation of the secondary winding.

15. A communication interface of a luminaire for enabling isolated communication between the luminaire and a connectable module, the communication interface comprising:
    a driver circuit adapted to receive a first DC input and second DC input, the first and second DC inputs for controlling a light emitting element of the luminaire, wherein the driver circuit is adapted to generate an AC power supply;
    a primary winding adapted to be magnetically coupleable to a secondary winding for powering the connectable module and connected to the driver circuit so as to receive the AC power supply;
    wherein the communication interface further comprises:
    a data sensing arrangement adapted to generate a control signal indicative of an induced current or voltage variation of the primary winding, the variation being induced by a current or voltage variation of the secondary winding;
    a control arrangement comprising a control system adapted to generate a coupling control signal based on the control signal and a switch arrangement configured to controllably couple the first DC input and the second DC input together or to a common voltage based on the control signal, such that a voltage difference between the first DC input and the second DC input is dependent upon the current or voltage variation of the secondary winding; and,
    a power select arrangement adapted to switch an input of the driver circuit between the first DC input and a reserve DC input based on the control signal.

\* \* \* \* \*